(12) United States Patent
Homer et al.

(10) Patent No.: US 7,187,538 B2
(45) Date of Patent: Mar. 6, 2007

(54) HINGE FOR ELECTRONIC DEVICE

(75) Inventors: Steven S Homer, Tombal, TX (US); Mark Solomon, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 364 days.

(21) Appl. No.: 10/820,910

(22) Filed: Apr. 7, 2004

(65) Prior Publication Data

US 2005/0225934 A1    Oct. 13, 2005

(51) Int. Cl.
*G06F 1/16* (2006.01)
(52) U.S. Cl. .................. 361/681; 361/683; 16/221
(58) Field of Classification Search ............... 361/681, 361/683; 16/221
See application file for complete search history.

(56) References Cited

U.S. PATENT DOCUMENTS

| | | | | |
|---|---|---|---|---|
| 3,315,773 A | * | 4/1967 | Aschauer | 192/48.2 |
| 5,085,394 A | * | 2/1992 | Torii | 361/681 |
| 5,168,426 A | * | 12/1992 | Hoving et al. | 361/681 |
| 5,200,913 A | * | 4/1993 | Hawkins et al. | 361/681 |
| 5,345,362 A | * | 9/1994 | Winkler | 361/681 |
| 5,548,478 A | * | 8/1996 | Kumar et al. | 361/681 |
| 6,163,451 A | * | 12/2000 | Chiu | 361/681 |
| 6,404,622 B1 | * | 6/2002 | Chen | 361/681 |
| 6,636,419 B2 | * | 10/2003 | Duarte | 361/681 |

* cited by examiner

*Primary Examiner*—Lisa Lea-Edmonds
(74) *Attorney, Agent, or Firm*—David W. Boyd

(57) ABSTRACT

A movable portion of an electronic device is attached to a base portion of the device by a hinge mechanism that enables an edge of the movable portion to translate as the movable portion is rotated during the opening of the portable electronic device. In one example embodiment, the hinge mechanism comprises a groove in the base portion, a guiding feature on the moveable portion that engages the groove, and a link attached to both the base portion and the moveable portion of the electronic device, the link relating relates the motions of the two portions such that the electronic device opens as the guiding feature travels along the groove.

19 Claims, 6 Drawing Sheets

AREA ENLARGED IN FIGURES 4A AND 4B

HINGE FOR ELECTRONIC DEVICE

FIELD OF THE INVENTION

The present invention relates generally to portable electronic devices.

BACKGROUND OF THE INVENTION

FIG. 1 shows a typical laptop computer 100. Laptop computer 100 has a base portion 101, which comprises a keyboard 106, a central processing unit, and often data storage devices. A display portion 102 typically comprises a display screen 105. The base portion and the display portion are connected by one or more hinges 103. The display portion can be thought of as rotating about axis 104 of the hinge to open or close the laptop computer. FIG. 1 shows the computer in the open configuration. In the closed configuration, display screen 105 and keyboard 106 are in close proximity, and the computer is substantially rectangular in shape. A laptop computer often contains at least one battery that enables the computer to be operated for a period of time without a connection to any power source external to the computer.

The portability of a computer such as laptop computer 100 is an advantage to computer users who wish to be mobile, enabling them to work in remote locations such as job sites, automobiles, and airplanes. However, a remote location may not be configured for convenient use of laptop computer 100. FIG. 2 depicts laptop computer 100 in position for use by a person seated in airline seat 201. Laptop computer 100 is placed on tray table 202 affixed to airline seat 203. With laptop computer 100 in its open configuration, display portion 102 encounters the back of seat 203 at location 204, necessitating that laptop computer 100 be moved toward the user, thus further limiting the already cramped space that the computer user, seated in seat 201, has for comfortably operating the computer. Other kinds of electronic devices, such as Digital Versatile Disc (DVD) viewers, personal digital assistants (PDAs), or dedicated word processors may suffer from the same difficulty.

SUMMARY OF THE INVENTION

A movable portion of an electronic device is attached to a base portion of the device by a hinge mechanism that enables an edge of the movable portion to translate as the movable portion is rotated during the opening of the portable electronic device. In one example embodiment, the hinge mechanism comprises a groove in the base portion, a guiding feature on the moveable portion that engages the groove, and a link attached to both the base portion and the moveable portion of the electronic device, the link relating the motions of the two portions such that the electronic device opens as the guiding feature travels along the groove.

DETAILED DESCRIPTION

Figure 1:
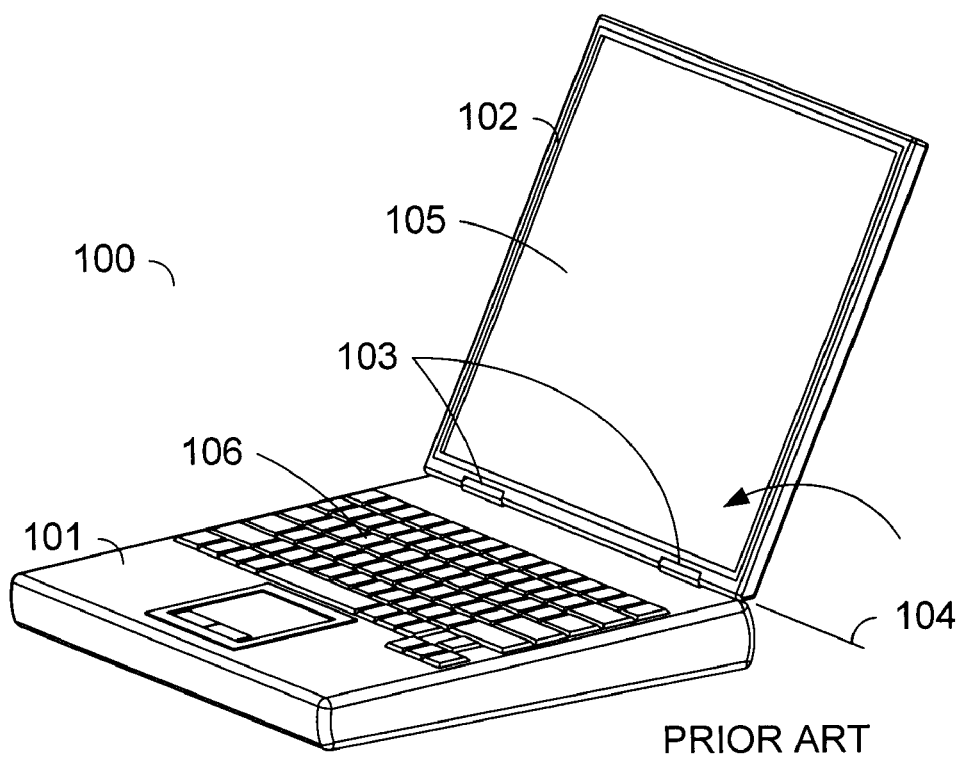
FIG. 1 shows a shows a typical laptop computer.
Figure 2:
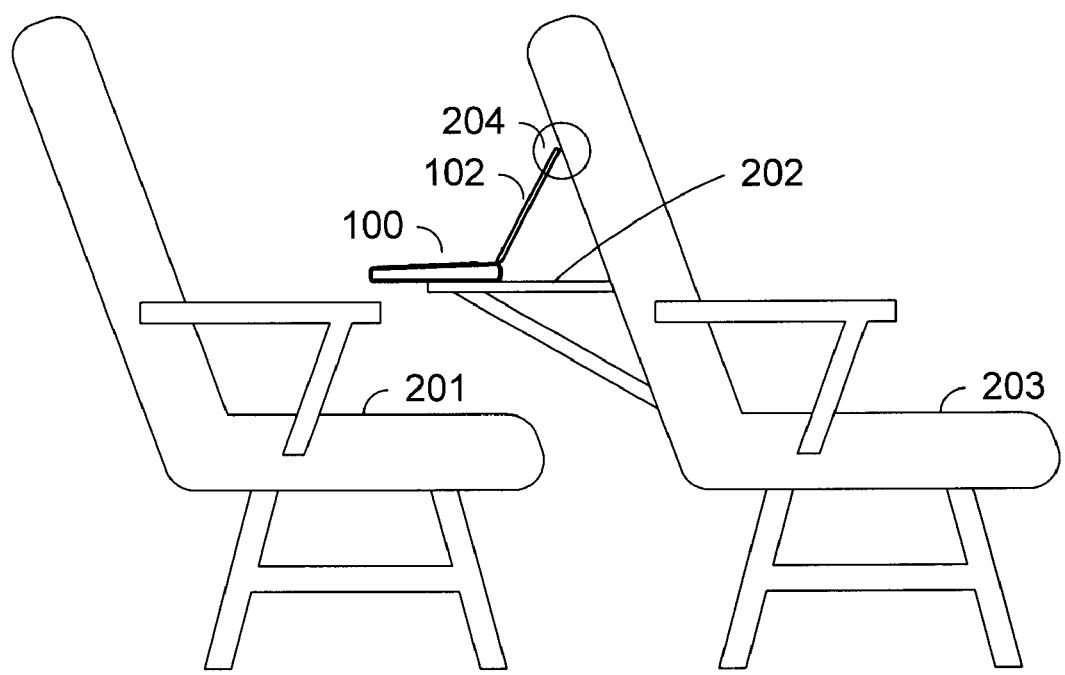
FIG. 2 depicts the laptop computer of FIG. 1 in position for use by a person seated in an airline seat.
Figure 3:
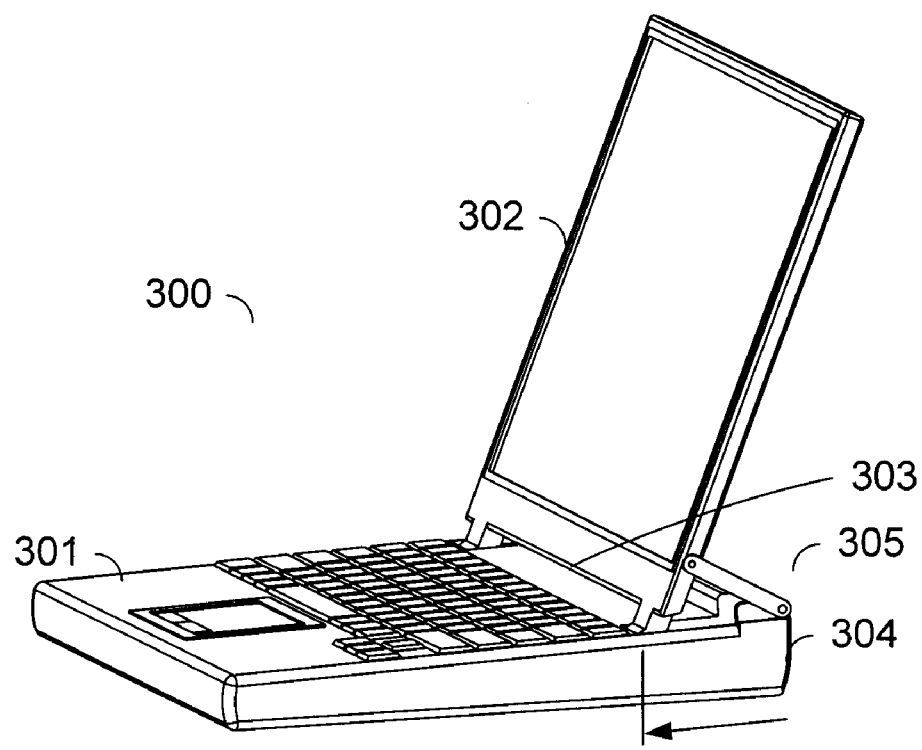
FIG. 3 shows a laptop computer in accordance with an example embodiment of the invention.

FIG. 3 shows a laptop portable computer 300 in accordance with an example embodiment of the invention. Base portion 301 and movable display portion 302 of portable computer 300 are connected through a hinge mechanism 305 such that when the computer is in its open configuration, edge 303 of display portion 302, the edge that is nearest base portion 301, is displaced from edge 304 of base portion 301. The following figures detail the workings of example hinge mechanism 305 that accomplishes this motion. Example laptop computer 300 incorporates two instances of hinge mechanism 305, in mirror image. Like reference numerals indicate the same parts in the figures.

Figure 4:
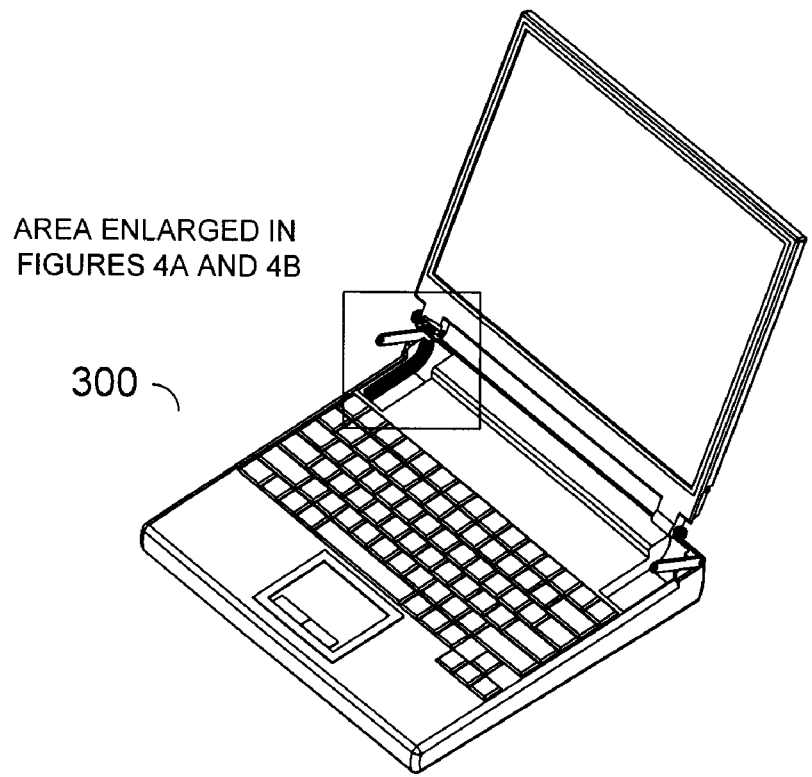
FIG. 4 shows a partially exploded and partially cutaway view of the example laptop computer of FIG. 3.
Figure 4A:
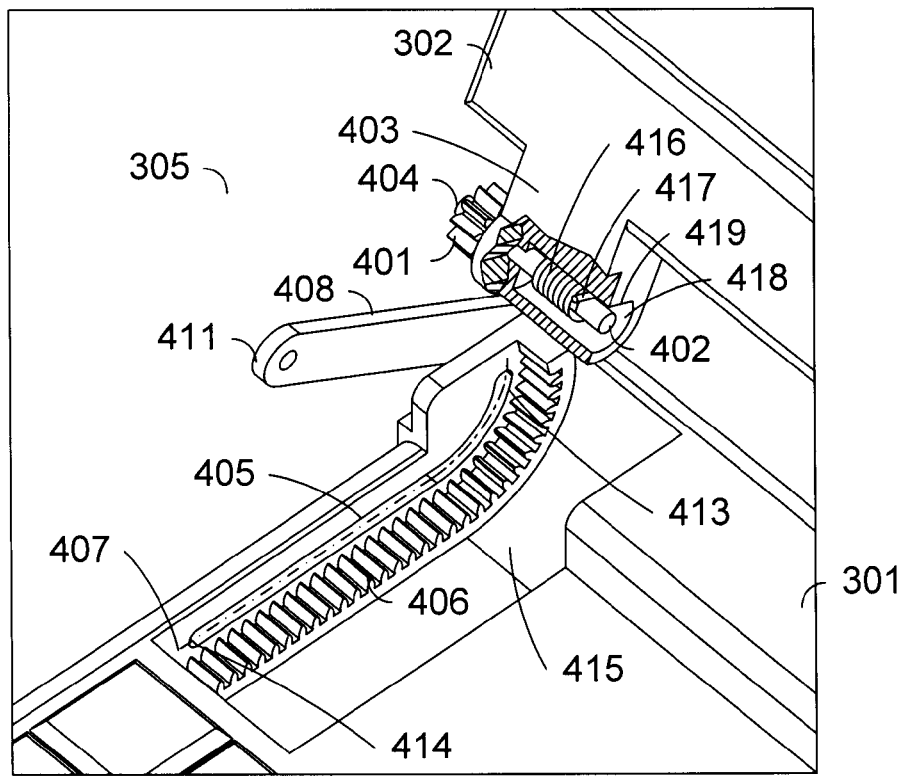
FIGS. 4A and 4B show enlarged views of a portion of the example laptop computer of FIG. 3.
Figure 4B:
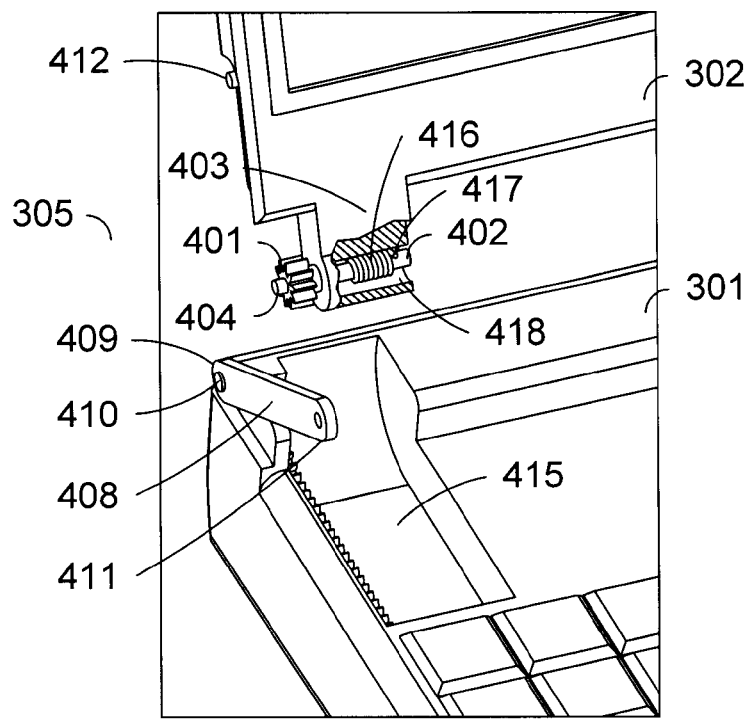

FIG. 4 shows a partially exploded and partly cutaway view of computer 300. In FIG. 4, display portion 302 has been displaced so that more of hinge mechanism 305 is exposed for viewing and explanation. FIGS. 4A and 4B are magnified views of the area indicated in FIG. 4. FIG. 4B is shown from a reverse angle.

Referring now to both FIGS. 4A and 4B, shaft 402 is journaled in depending member 403 of display portion 302 of example laptop computer 300. Distal end 404 of shaft 402 protrudes such that when display portion 302 is fully assembled to base portion 301, engages groove 405 in base portion 301. Distal end 404 thus is a guiding feature that provides a constraint on the relative motion of base portion 301 and display portion 302. Groove 405 may be formed into base portion 301 by any of a number of methods. For example, it may be molded into base portion 301, or it may be formed as a cutout in a sheet metal insert in base portion 301. One of skill in the art will recognize other ways to form the elements of hinge mechanism 305. Groove 405 has a centerline 407 equidistant from the two generally parallel sides of the groove.

Link 408 provides another constraint on the relative motion of base portion 301 and display portion 302. Rear end 409 of link 408 attaches to base portion 301 at pivot 410. Pivot 410 may be a shoulder screw, a stud, or another element providing an equivalent function. Forward end 411 of link 408 attaches to display portion 302 at pivot 412, which is displaced in FIGS. 4, 4A, and 4B because the views are partially exploded. Link 408 is substantially rigid, and constrains base portion 301 and display portion 302 such that pivot 410 is a constant distance from pivot 412.

When example laptop computer 300 is closed, guiding feature 404 rests near rear end 413 of groove 405. As example laptop computer 300 is opened, guiding feature 404 travels along groove 405 toward forward end 414. In the process, link 408 constrains the relative positions of base portion 301 and display portion 302 such that the opening angle between them is a prescribed function of the position of guiding feature 404 in groove 405. During opening, depending portion 403 of display portion 302 sweeps through cavity 415 in base portion 301.

Figure 5A:
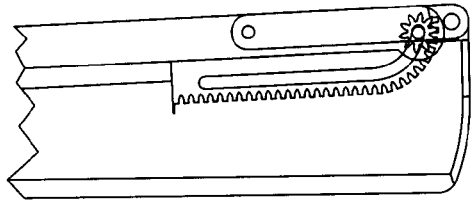
FIGS. 5A–5E schematically show partially cutaway views of the example laptop computer of FIG. 3 in progressive stages of opening.
Figure 5B:
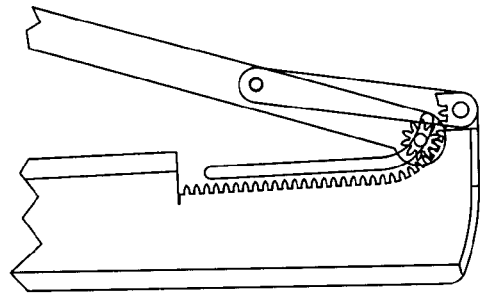
Figure 5C:
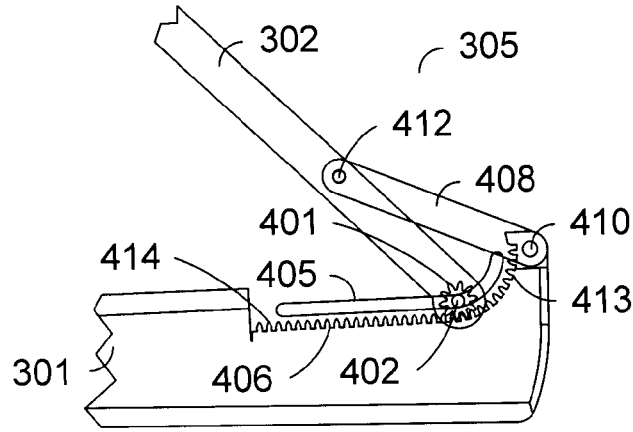
Figure 5D:
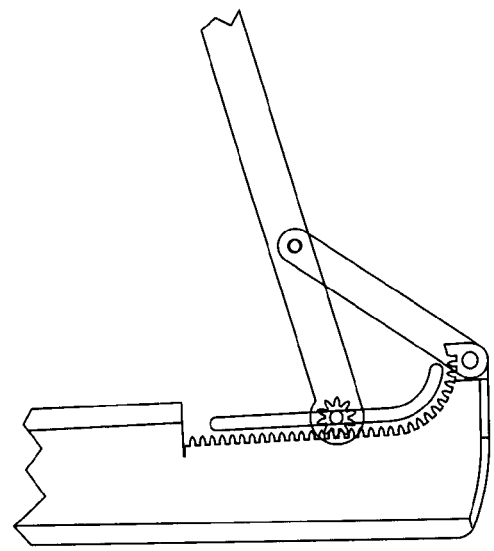
Figure 5E:
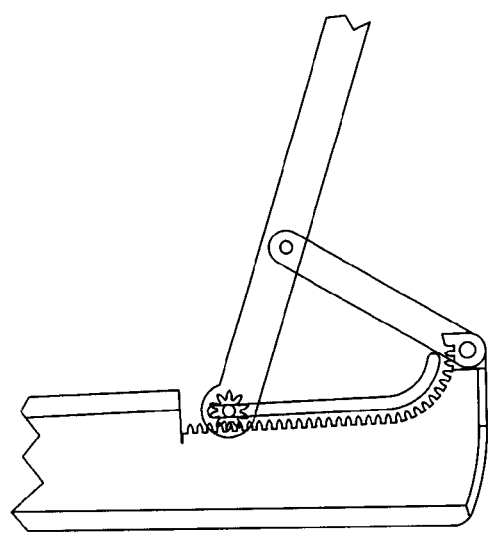
Figure 6:
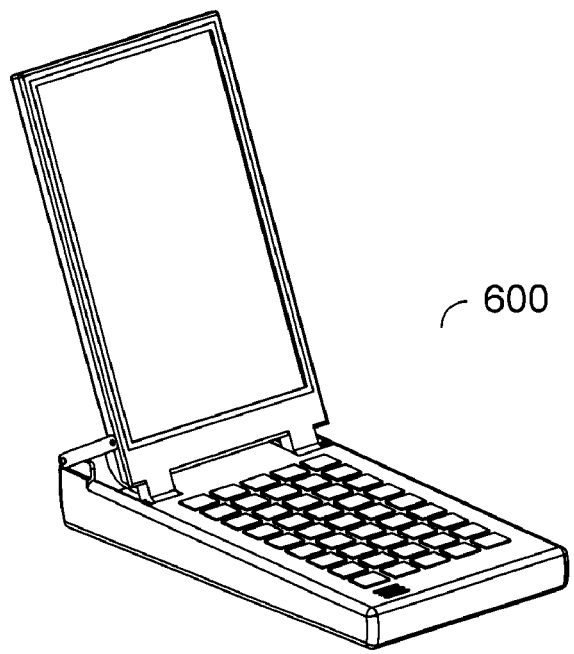
FIG. 6 depicts a personal digital assistant in accordance with an example embodiment of the invention.
Figure 7:
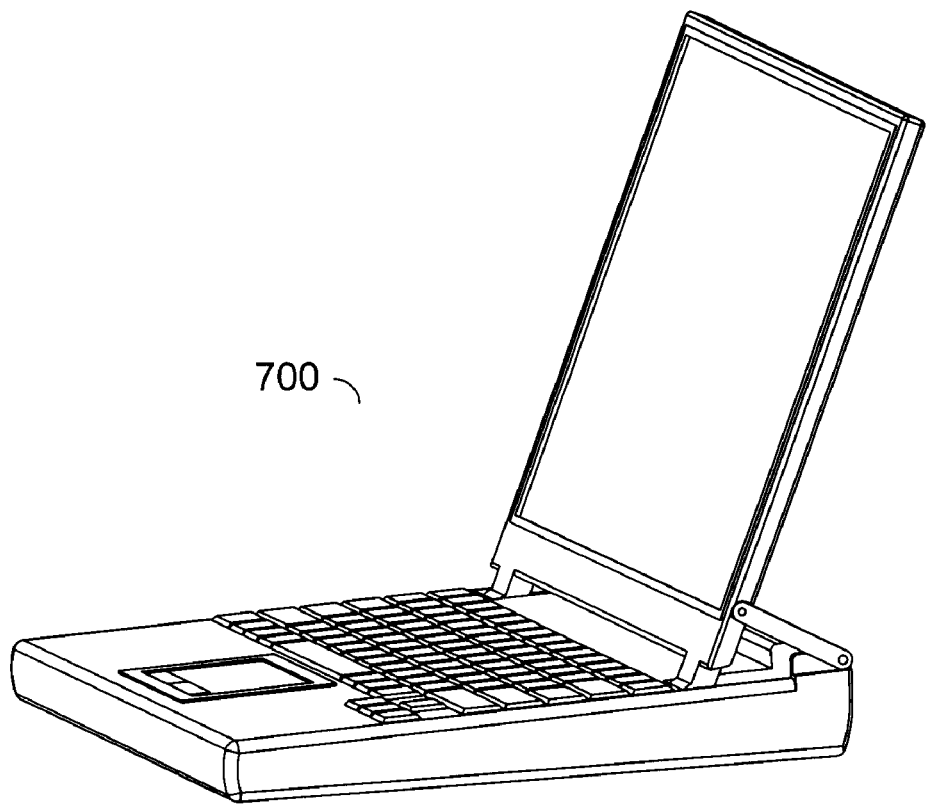
FIG. 7 depicts a dedicated word processor in accordance with an example embodiment of the invention.
Figure 8:
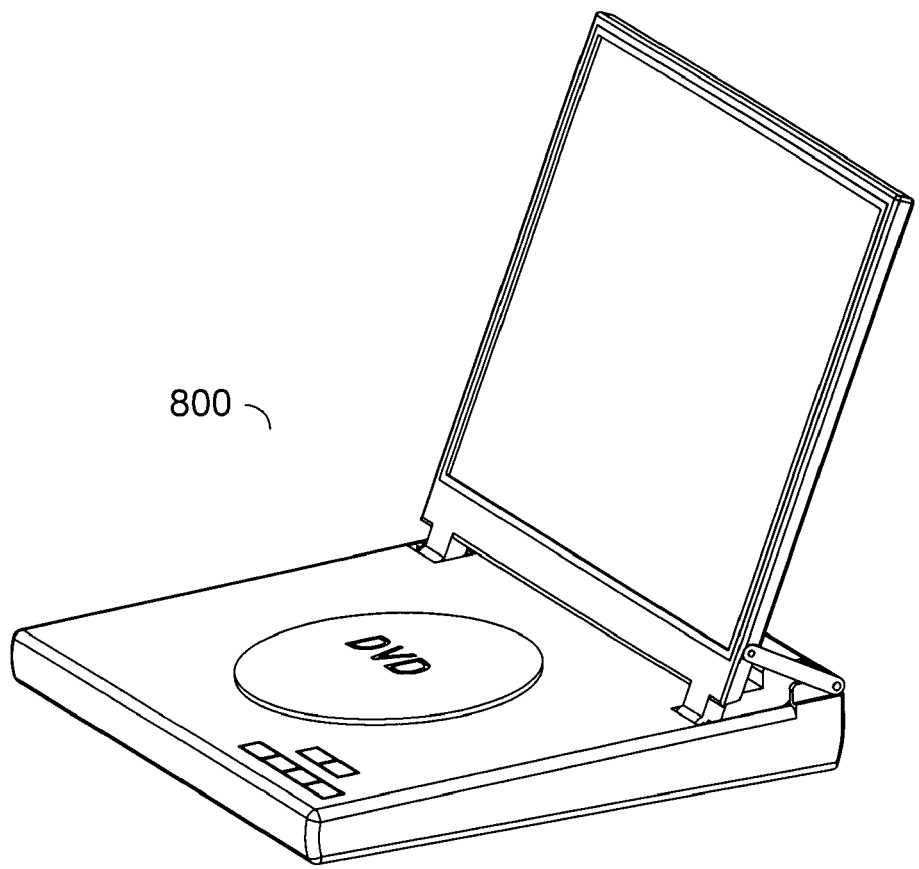
FIG. 8 depicts a Digital Versatile Disc viewer in accordance with an example embodiment of the invention.
Figure 9:
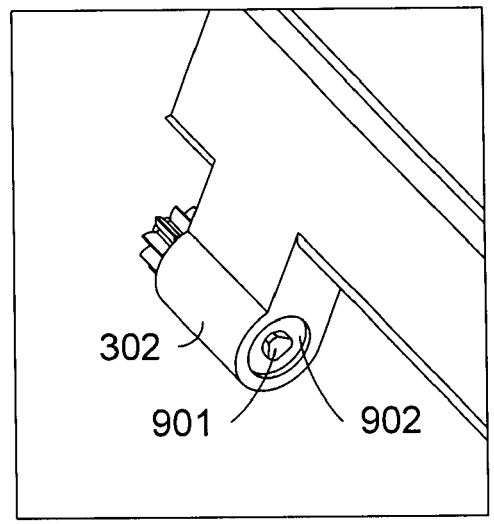
FIG. 9 depicts a friction inducing device in accordance with an example embodiment of the invention.

FIGS. 5A–5E schematically show partially cutaway views of example laptop computer 300 in progressive stages of opening, from fully closed in FIG. 5A to nearly fully open in FIG. 5E. Some features of example laptop computer 300 have been omitted from these views for clarity in showing the action of hinge mechanism 305.

A user of example laptop computer 300 may wish to open the computer to a preferred viewing angle, and have display portion 302 stay in this preferred relationship to base portion 301 while still being adjustable with moderate effort. Hinge mechanism 305 may comprise a friction-inducing device for facilitating this ability. Referring again to FIGS. 4A and 4B, gear 401 is fixedly attached to shaft 402. Also formed in base portion 301 is curved gear rack 406. Gear rack 406 has a pitch line (not shown) that is a substantially uniform distance from centerline 407 of groove 405. A pitch line is a theoretical line along which the pitch of a gear is measured. Gear 401 engages and travels along gear rack 406 when distal end 404 of shaft 402 travels along groove 405.

Gear 401 is fixedly attached to shaft 402 so that shaft 402 rotates as gear 401 travels along gear rack 406. Spring 416 wraps around shaft 402, exerting light compressing force on shaft 402. Spring 416 comprises at least one tail portion 417. Cavity 418 in display portion 302 is sufficiently large to contain spring 416, and is generally cylindrical but for one flattened side 419. Flattened side 419 prevents the rotation of spring 416 within cavity 418. Because shaft 402 rotates and spring 416 cannot, friction is induced that resists the rotation of shaft 402, holding screen portion 302 in a position set by the computer user. Spring 416 is thus part of a wrap spring friction clutch. The dimensions of spring 416 and shaft 402 are chosen such that the friction is sufficient to hold screen portion 302 in position, but to still enable the easy adjustment of screen portion 302.

Other friction-inducing devices could be used within the scope of the appended claims. For example, shaft 402 could be a three-lobed shaft 901 that rotates in a compliant, generally-cylindrical collar 902 attached to display portion 302. Alternatively, depending portion 403 of display portion 302 could contact a wall of cavity 415 on base portion 301 so that the sweeping motion of depending portion 403 is resisted by the friction between the two parts. An intermediate material could be chosen to provide the appropriate coefficient of friction.

While the invention has been described by way of example as embodied in a laptop computer, it may be embodied in other electronic devices as well. For example, a personal digital assistant (PDA) 600 is a portable electronic device that enables a user to carry data and perform some computing applications, such as maintaining an appointment calendar and address book. Many PDAs comprise a base portion and a moveable display portion. The invention may be embodied in a PDA. Other kinds of electronic devices that may open and close in a similar fashion and could embody the invention comprise dedicated word processors, and dedicated viewers for Digital Versatile Discs (DVDs). A dedicated word processor 700 may contain many of the components of a computer, but lack the general configurability of a computer, but instead be configured to enable a user to compose, edit, and print documents. A viewer 800 for DVDs typically comprises a base portion comprising a mechanism that can read data from a DVD, and a display portion on which the contents of the DVD are displayed. Such viewers are often portable, and may be used to watch movies or other entertainment programming.

The invention claimed is:

1. A electronic device, comprising:
   a base portion;
   a movable portion having an edge nearest the base portion;
   a hinge mechanism that enables the edge of the movable portion nearest the base portion to translate in relation to the base portion as the movable portion is rotated during opening of the electronic device; and
   a friction inducing device that resists relative motion of the base and movable portions, the friction inducing device being one of a) a wrap spring friction clutch and b) a lobed shaft rotating in a compliant collar.

2. The electronic device of claim 1 wherein the electronic device is a portable computer.

3. The electronic device of claim 1 wherein the electronic device is a personal digital assistant.

4. The electronic device of claim 1 wherein the device is a dedicated word processor.

5. The electronic device of claim 1 wherein the device is a viewer for a Digital Versatile Disc.

6. An electronic device, comprising:
   a base portion
   a groove formed in the base portion;
   a movable portion having a guiding feature that engages the groove;
   a link having a first link end attached to a first pivot on the base portion, and having a second link end attached to a second pivot on the moveable portion; and
   a friction inducing device that resists relative motion of the base and movable portions, the friction inducing device being one of a) a wrap spring friction clutch and b) a lobed shaft rotating in a compliant collar;
   and wherein the link constrains the relative motion of the base portion and the movable portion such that the electronic device opens as the guiding feature travels along the groove.

7. The electronic device of claim 6, wherein the moveable portion comprises a display screen.

8. The electronic device of claim 6, further comprising:
   a second groove formed in the base portion;
   a second guiding feature on the moveable portion engaging the second groove; and
   a second link connecting pivots on the base portion and the movable portion.

9. The electronic device of claim 6, further comprising:
   a shaft journaled in the moveable portion, one end of the shaft being the guiding feature;
   a gear fixedly attached to the shaft; and
   a gear rack formed in the base portion such that the gear engages the gear rack when the guiding feature engages the groove.

10. The electronic device of claim 9, further comprising a spring wrapped around the shaft and constrained such that the spring does not rotate in relation to the moveable portion when the shaft rotates.

11. The electronic device of claim 6 wherein the friction-inducing device holds the base and moveable portions in a relationship set by a user of the electronic device, and enables adjustability of the relationship.

12. The electronic device of claim 6 wherein the electronic device is a portable computer.

13. The electronic device of claim 6 wherein the electronic device is a dedicated word processor.

14. The electronic device of claim 6 wherein the electronic device is a personal digital assistant.

15. The electronic device of claim 6 wherein the electronic device is a viewer for a Digital Versatile Disc.

16. An electronic device, comprising:
    means for translating an edge of a moveable portion of the electronic device in relation to a base portion of the electronic device as the moveable portion is rotated in the process of opening the electronic device; and
    means for inducing friction that resists relative motion of the movable and base portion;
    and wherein the means for inducing friction is one of a) a wrap spring friction clutch and b) a lobed shaft rotating in a compliant collar.

17. A hinge mechanism for an electronic device, comprising:
    a groove in a first portion of the electronic device;
    a guiding feature on a second portion of the electronic device, the guiding feature engaging the groove;
    a link connecting a first pivot on the first portion of the electronic device with a second pivot on the second portion of the electronic device and constraining the relative motion of the first and second portions such that the electronic device opens as the guiding feature travels along the groove; and
    a friction inducing device that resists relative motion of the base and movable portions, the friction inducing device being one of a) a wrap spring friction clutch and b) a lobed shaft rotating in a compliant collar.

18. The hinge mechanism of claim 17, further comprising:
    a gear rack formed in the first portion of the electronic device;
    a gear attached to the second portion coaxial with the guiding feature, the gear engaging the gear rack when the guiding feature engages the groove; and
    a shaft fixedly attached to the gear and journaled in the second portion of the electronic device.

19. The hinge mechanism of claim 18, further comprising a spring wrapped around the shaft such that friction between the spring and shaft resists rotation of the shaft.

* * * * *